United States Patent [19]
Einbinder

[11] Patent Number: 5,794,639
[45] Date of Patent: Aug. 18, 1998

[54] ADJUSTABLY CONTROLLABLE WALKER

[76] Inventor: Eli Einbinder, 121 E. 60th St., New York, N.Y. 10022

[21] Appl. No.: 725,705

[22] Filed: Oct. 4, 1996

Related U.S. Application Data

[63] Continuation-in-part of Ser. No. 551,137, Oct. 31, 1995.

[51] Int. Cl.$^6$ ..................................... A61H 3/00
[52] U.S. Cl. ........................ 135/67; 135/912; 135/66; 135/77; 135/82; 188/5; 188/31; 280/47.34; 280/87.041
[58] Field of Search ................. 135/66, 67, 77, 135/79, 82, 84, 85, 912; 188/5, 19, 60, 31, 158; 280/47.34, 87.041

[56] References Cited

U.S. PATENT DOCUMENTS

| | | | |
|---|---|---|---|
| 2,792,874 | 5/1957 | Sundberg | 135/67 X |
| 2,796,916 | 6/1957 | Wumble | 135/67 |
| 2,981,312 | 4/1961 | Sundberg | 188/5 X |
| 3,356,185 | 12/1967 | Isaacks | 188/5 X |
| 3,917,203 | 11/1975 | Heubeck et al. | 188/5 X |
| 4,251,105 | 2/1981 | Barker | 135/67 X |
| 4,280,595 | 7/1981 | Timms et al. | 188/31 |
| 4,434,808 | 3/1984 | Burak . | |
| 4,510,956 | 4/1985 | King | 135/67 X |
| 4,697,808 | 10/1987 | Larson et al. . | |
| 4,768,536 | 9/1988 | Hawkins . | |
| 5,133,377 | 7/1992 | Truxillo | 135/67 |
| 5,172,715 | 12/1992 | Webb | 135/67 |
| 5,277,438 | 1/1994 | Chuang et al. . | |
| 5,320,122 | 6/1994 | Jacobson et al. . | |
| 5,378,215 | 1/1995 | Harkins . | |
| 5,511,571 | 4/1996 | Adrezin et al. . | |

FOREIGN PATENT DOCUMENTS 1096547  12/1967  United Kingdom .

OTHER PUBLICATIONS

*Engineering News*, "Latch aids walker maneuvers, cuts assembly time" Minor Rubber Co., Inc., Design News/Jun. 10, 1996.

*Primary Examiner*—Wynn E. Wood
*Attorney, Agent, or Firm*—Jones, Tullar & Cooper, P.C.

[57] ABSTRACT

A controller for wheeled vehicles includes a mechanism which selectively shifts the vehicle between a mobile and a stable state. The vehicle may be a walker for easing an operator's efforts in walking and includes a selectively actuable stabilizer which fixes the position of the walker or releases it for rolling motion, thus providing a stable state or a mobile state, respectively. An actuator such as a button, pressure sensor, or lever, electrically and/or mechanically actuates a stabilizer brake mechanism to engage or release the brake and thereby allow the walker's mobility to be controlled when the actuator operates the brake to stabilize or to slow the motion of the walker. Preferably, lift applied to the vehicle itself releases the brake and allows mobility. The actuator may control an electrically actuated braking mechanism, in response to a sensor such as a strain gauge that may be adjusted to the needs of the patient; alternatively, lifters may be provided to act in response to the lifting force.

23 Claims, 6 Drawing Sheets

ADJUSTABLY CONTROLLABLE WALKER

BACKGROUND OF THE INVENTION

This is continuation-in-part of U.S. application Ser. No. 08/551.137. filed Oct. 31, 1995.

The present invention pertains, in general, to methods and apparatus for controlling the movement of wheeled vehicles of the type that ordinarily would be pushed or pulled by an operator, and, more particularly, to the application of such methods and apparatus to walking aids for weak but ambulatory people, and for apparatus for adjusting such walking aids to meet the particular and evolving needs of such people.

A wide range of structures have been devised to assist people who find it difficult to walk unaided, and who may be lacking in strength or manual dexterity. A commonly-used structure for this purpose, customarily referred to as a walker, is fabricated from tubing, has three or four vertical legs and at least one horizontal support bar, and is lightweight enough to enable the ambulatory person to move it between steps. Such structures require the user to manually grasp the walker, lift it, and move it forward a desired distance. The user then walks behind the structure to a position of greater stability near the walker.

In addition to providing a stable support for moving about, walkers are especially useful for ambulatory people who may have dizzy spells, for then the walker serves as a stable structure with which the person using the device may support himself or herself when needed. If the user stumbles, a fall may be avoided by quickly grasping the walker, and for these reasons, the stability of a walker is of utmost importance.

Walkers, as executed in the prior art, have some problems, however. A lightweight walker can be easy to lift, but because of its lightness, it may not be stable, whereas a heavy walker will be stable, but difficult to lift. The operation of lifting and moving a conventional walker can make locomotion difficult, awkward, and unstable for people who are too weak to firmly grasp or to lift it, for during the time that the walker is being lifted and moved, the user is less stable even than would ordinarily be the case when standing alone and without external support. Thus, the act of lifting the walker can be a source of difficulty for the user.

To overcome this problem, walkers have been designed with wheels, some with motor-driven wheels, which allow the user to move the walker without having to lift it. However, wheels make the walker essentially unstable.

This problem has been recognized, and attempts have been made to lend stability by manually actuable, cable-operated hand brakes for the wheels on walkers. Again, however, the use of hand brakes presents its own problem, since the operator may be afflicted with arthritis or some other debilitating injury or illness which prevents or makes difficult the laborious operation of the brake and maintenance of the steady pressure required to operate it. These hand brakes are also not well suited for one needing a steadying support after a sudden stumble, since at such times, when one quickly reaches for the walker, one is unlikely to readily grasp the hand brake, which may be far in front of the user. Further, squeezing a brake may be uncomfortable or difficult to coordinate.

Attempts to improve the stability of walkers with wheels includes the use of various spring-loaded braking arrangements such as the so-called glide brakes which gradually, although inefficiently, brake the walker when weight or downward pressure is applied. In such devices, wheels may be mounted on telescoping legs which are spring-biased to move the wheels into contact with the ground to provide mobility for the walker. When the operator leans on the walker, the operator's weight overcomes the spring bias to telescope the wheel, allowing the walker leg to gradually contact the ground and provide a brake. Unfortunately, however, most of the "downward" force applied to a walker in motion is, in reality, a forward force. Therefore, such arrangements can be hazardous to the operator, since they do not respond to users' different characteristics and abilities, with the result that the walker can roll away from the operator if insufficient pressure is being applied, or may stop prematurely upon application of a light pressure. Many walkers use a combination of wheels and legs; for example, two legs at the rear of the walker and two wheels at the front, to prevent accidental rolling, but such walkers can be awkward to use, since they require some lifting and rolling at the same time.

Motorized walkers with motor driven wheels have been provided, and some walkers have a predetermined operation when switched on so that they will move only a preselected distance. However, such devices may be heavy, and thus dangerous, and further, they may essentially remove control of operation from the operator and may, if accidentally activated, present additional danger to the operator.

In many cases, individuals who need, or who would feel more comfortable with, a walker is deterred from using one because most walkers, although light in weight, are relatively large. This makes them difficult to maneuver in crowded areas or to store when not in use.

A still further problem with prior walking aids is their inability to provide for differing and changing needs. Individual's needs evolve as their conditions improve or deteriorate, but prior walkers have not been able to accommodate to such changes. As a result, a walker that is initially suitable for an individual may gradually become unsuitable over a period of time, nor can it always be used by another person, such as a friend or family member.

Accordingly, there exists a need for a walker which can be operated by the feeble or infirm and which can be easily, reliably, and selectively made stable or mobile, and which can be adjusted to meet evolving or different needs.

SUMMARY OF THE INVENTION

It is an object of the invention is to provide an improved, walker which is simple, which is easy to use, and which can be adjusted.

It is another object of this invention to provide a walking aid which is adjustable to accommodate the evolving needs of an operator or the differing needs of different operators, and which permits conversion of a stable walker into a mobile walker, or vice versa.

It is also an object of this invention to provide a walker which is inherently stable, and which can be easily switched between stable and mobile states by an operator in a way which tends to allow coordination of its operation with walking.

It is a further object of this invention to provide a walker having an actuator for controlling the movability of the walker, and where the actuator structure and force requirements can be preselectable and/or adjustable to meet the needs of an operator and to provide for changes in those needs.

Another object of the invention is to provide a walker which may be actuated to a mobile state by applying lift to the walker or to an extension or other portion of the walker, and where the force required to activate may optionally be adjustable.

A still further object is to provide a foldable walker which may also include wheels and brakes which can be actuated to control its movability either when in its normal condition or when it is folded to a smaller configuration.

Briefly, the present invention is directed to modifications of presently-available walkers of the type which include wheels for mobility, for improving them and for facilitating their use where conditions and needs differ or change from time to time. In general, the modifications of the present invention include, controllers for the wheeled walkers which permit selective engagement or release of brakes to stabilize the walker. The brakes can take a variety of forms and thus may include elements which engage the ground or are disengaged, or may include elements which interact with or are a part of the wheels to provide an adjustable rolling resistance so that the effort required to roll the walker can be calibrated to the needs of the operator.

The brakes may be mechanical or electrical, and various mechanical, electrical or electromechanical actuator devices are provided to facilitate their operation and control. For example, the brake may be a spring-biased braking mechanism which is normally engaged to provide passive braking or, alternatively, which is normally released to provide active braking, with an electrically operated actuator responsive to the operator and being connected to operate the brake. The actuator can be responsive to pressure applied by the operator, so that downward pressure, for example, on the walker will engage (or release) the brake. The actuator also can be located to respond to lifting pressure by the operator to operate the brake, releasing it or engaging it as desired, but in either case the actuator may optionally be adjustable to permit calibration to meet the operator's needs.

More particularly, the present invention is broadly directed to an improvement in a wide variety of wheeled vehicles, particularly those which are ordinarily pushed or pulled by an operator, and to methods and apparatus for controlling such vehicles. In its simplest form, the improvement is a mechanism which selectively transfers the wheeled vehicle from a normally stable state to a state of mobility under the control of a user/operator/patient. In a preferred embodiment, the vehicle is a walker which includes at least one wheel and a selectively actuable brake, or stabilizer, which fixes the position of the walker. An actuator responsive to mechanical motion, such as a switch responsive to bending, rotating or linear motion of a part of the walker structure, a pressure sensor such as a strain gauge, or other structure responsive to operator-imposed forces such as a lifting pressure, downward pressure or the like, or a suitable motion-sensitive switch is provided to respond to an operator to operate a stabilizer mechanism. The stabilizer may be released to allow the walker to be moved or engaged to stabilize the walker in response to operator actuation. In one form of the invention, the stabilizer mechanism is a normally engaged brake which is released by the actuator. This normally engaged mechanism may be termed a "passive brake," and allows an ambulatory patient or other user or operator to move the walker only when the actuator is actuated to release the stabilizer mechanism and to thereby transfer the walker from its stable state to its mobile state. The stabilizer and the actuator mechanism may optionally be adjustable to respond to different levels of pressure or effort for operation, to accommodate different operators. If desired, the system may operate under the control of the actuator to engage the stabilizer mechanism, instead of releasing it, so that the walker is normally in a mobile state.

A method for operator locomotion with the aid of the wheeled vehicle of the invention includes the operator grasping a normally stable vehicle with at least one hand, operating the actuator to release a normally activated brake to thereby place the vehicle in its mobile state, moving the wheeled vehicle some distance, and releasing the actuator to reactivate the brake mechanism to return the vehicle to the stable state. In accordance with the invention, the motion of the vehicle can be constrained to prevent the walker from running away from the operator during use, as well as providing stabilizing resistance.

The actuator of the present invention preferably is an electrical switch or a pressure sensor which is activated by the operator to selectively engage or release an electrically or mechanically operated brake mechanism. When the operator wants to move, for example, the actuator is operated to release the brake; when the operator wants to stop, he or she can release the actuator to engage the brake. Optionally, the actuator mechanism may be adjustable to be responsive to a preselected operating condition that can be calibrated to match the operator's needs and adjusted as those needs change.

The actuator may be, in one form of the invention, a pressure sensor such as an electrical strain gauge calibrated to respond to a selectable, predetermined pressure applied by the operator. The sensor, which may be connected to a suitable microprocessor, senses when a predetermined pressure has been placed on it, either directly or through the walker structure, by the operator, and produces a signal which is received by the microprocessor to activate the stabilizer mechanism to activate or to deactivate a brake, for example. The amount and direction of pressure which is required to cause the actuator to activate the stabilizer mechanism can be individually calibrated or preselected to meet the requirements of each user or can be adjusted to meet the changing needs of a single user. Since, as is well known in the art, pressure sensors such as strain gauges are capable of sensing forces of as little as one ounce or less, and can also sense very large forces, the walker of the present invention can be provided with a sensor that can meet the needs of a wide range of operators. Such an actuator can be calibrated to allow an ambulatory patient with, for example, severe arthritis, to operate the stabilizer mechanism on the walker with very little force, or can be adjusted to respond to heavy pressures applied by a more vigorous or a heavier operator who places his or her full weight on the sensor.

In another embodiment of the invention, the actuator may be a mechanically operated brake controller, where motion of the walker, such as a lifting motion, releases a mechanical latch to release a brake. A further embodiment may incorporate a electromechanical actuator wherein, for example, a switch lever is shifted by relative motion of telescoping parts to operate an electrical switch. In still another form of the invention, relatively movable parts of the walker, such as telescoping components of a support leg, can form the movable contacts of a switch.

By proper location and calibration of the actuator, the walker can be controlled by any operator; the operator need not firmly grasp the walker, but needs only to touch it with a preselected pressure to actuate a pressure sensitive switch or to cause motion which actuates a latch or an electormechanical switch. The actuator can be positioned on an upwardly facing surface of a horizontal walker bar, for example, or on a downwardly facing surface, on forward or rearward surfaces, or on all of these, can be incorporated in a glove secured to the walker, can be mounted on a handle on the walker, or can be built into the walker structure, as in one or more selected support legs, so that the actuator can respond when the operator's hands are positioned at any desired location to render the walker selectively mobile or stable when predetermined downward or upward pressures are exerted.

The stabilizer mechanism used for the walker can take different forms. For example, the walker may be constructed with rubber feet which normally contact the ground and which act as normally activated "safety" brakes and with solenoid-operated retractable wheels, selectively movable to a lowered position, to thereby release the brake mechanism and to place the walker in a mobile state. The walker is returned to the stable state when the wheels are returned to the retracted position and the walker again rests on the rubber feet. In a closely related alternative embodiment, the walker is constructed with wheels on static vertical supports and has solenoid-operated retractable rubber feet which can act as the safety brake mechanism. These feet are normally in a lowered position, thus placing the walker in the stable state. The walker is shifted to a mobile state when the rubber feet are moved to a retracted position so that the walker rests on the wheels. In each of the foregoing arrangements a "normal" condition may be defined as having a brake activated; i.e., with retractable wheels retracted in one embodiment, or with retractable feet deployed in the other embodiment. In each case, the brake mechanism may be electrically or mechanically driven in response to the operation of an actuator to shift the wheels down or the feet up to release the brake and allow the walker to move in response to operator commands. These commands will be in the form of switch actuation, pressure on a sensor, or the like, with the brake mechanism returning to its "normal" or engaged condition upon release of the actuator.

In one embodiment of the stabilizer mechanism, the wheels or feet can be mechanically activated by bias springs which can shift the wheels or feet to provide the mobile and stable states of the walker. Such bias springs can be connected to respond to a predetermined pressure on the walker to release the stabilizer mechanism and allow the walker to be moved or to engage the stabilizer mechanism to prevent the walker from moving. Thus, for example, a brake mechanism may be pressed into engagement with a wheel or with the ground, against a spring bias and held in place by a latch. An actuator may be provided to respond to downward (or upward) pressure either directly on the actuator or indirectly through the walker to disengage the latch and allow the spring to release the brake. The brake can then be reset by a suitable lever action responsive, for example, to the weight of the operator. The actuator and/or the spring bias can be adjustable to enable the walker to be calibrated to the needs of the operator; for example to the operator's weight or degree of disability.

In another embodiment, the wheels or feet can be electromechanically operated, for example by solenoids which include movable armatures, or drivers, connected to the wheels or feet. Electrical power supplied to the solenoids shifts the wheels or feet between mobile and stable states in response to suitable actuators, such as the switches or pressure sensors described above. Alternatively, an electromechanical stabilizer mechanism can include a disc or drum brake surface on a wheel, with a solenoid-driven brake pad movable into contact with the brake surface again in response to operation of a suitable actuator. Still another alternative is the provision of a wheel locking mechanism wherein a hub on the wheel or on a rotating axle is provided with a multiplicity of radial holes around its circumference. A latching pin is positioned adjacent the hub, and upon release drops into one of the holes to prevent rotation of the hub. A solenoid coil may be provided to pull the pin out of the radial hole upon energization to release the brake.

In still another embodiment, the stabilizer mechanism can be electrically or magnetically operated in response to the operation of one of the actuators described above. For example, the stabilizer mechanism may be a magnetic brake assembly located on a wheel. Such an assembly may include a brake disc mounted on or forming part of the wheel, and an adjacent solenoid which, when activated, is magnetically attracted to the disc to produce a braking action. An electrically operated brake may take the form of an electric drive motor for a wheel which can either directly drive the wheel or drive it through suitable gears. The motor may be operated with one polarity to drive the wheel and may be either turned off, or operated with opposite polarity to drive the motor in reverse to effectively brake it.

It may also be desirable to provide a brake which can engage one or more of the wheels with adjustable pressure to regulate the freedom of rotation of the wheel and thus regulate the degree of freedom of motion of the walker. Such brakes can be disc or drum-type brakes, or electrically or magnetically operated brakes located in a wheel of the walker and responsive to any desired actuator, to activate the brakes either fully or partially. Such a system can provide a variable drag, or resistance, on the wheels of the walker during use, for example, to prevent the walker from moving too quickly when the stabilizer is disengaged. Such a variable system may also allow adjustment of the walker to accommodate to operators of different weights or different physical abilities, and may allow an operator to change the braking force available under varying circumstances.

In the most preferred form of the invention, a walker is provided with at least one ground-engaging wheel with a normally-engaged, electrically-controlled brake to hold the walker in its stable mode. The wheel incorporates, for example, a disc brake that is engaged, but is controllably released by an actuator which responds to lifting force applied to the walker by the user. The actuator is incorporated in the walker structure so that when the user lifts it, for example to move from one location to another, the sensor sends a corresponding signal to release the brake and allow the wheel to rotate. The sensor may be a strain gauge, for example, or a microswitch sensitive to a predetermined force, and may be connected to a micropressor which responds to the operation of the switch to release the brake. The brake is adjustable so that it can be fully released, or can be only partially released to provide a selected amount of resistance to the movement of the walker. Further, the sensor is adjustable to enable the brake to be released only upon a predetermined minimum lifting force.

If desired, the wheel may be electrically driven, as by an electric motor built into or connected to the wheel, to drive the walker forward when the brake is released.

The provision of the foregoing controls for a walker provide significant benefits to the user, for they simplify its operation, improve its safety, and allow adjustment of the device to meet current and future needs as the users' physical condition changes. Considerable economic advantages are realized, since the user does not have to purchase different walkers during rehabilitation, for example. Further, the adjustability of the walker allows a supplier to stock fewer different types of walkers, for a single walker can be calibrated to the needs of a variety of users.

BRIEF DESCRIPTION OF THE DRAWINGS

The foregoing and additional objects, features, and advantages of the invention will become apparent to those of skill in the art from the following detailed description of the preferred embodiment, taken with the accompanying drawings, in which.

DESCRIPTION OF PREFERRED EMBODIMENT

Figure 1:
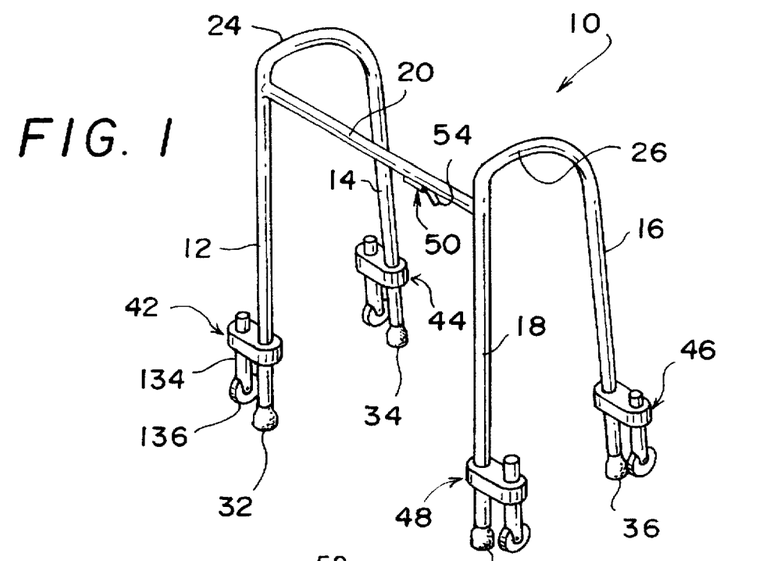
FIG. 1 is a diagrammatic perspective view of a walker having an electromechanical stabilizer mechanism including having solenoid-operated retractable wheels illustrative of the principles of the present invention.

Turning now to a more detailed description of the present invention, there is illustrated at 10 in FIG. 1 a typical walker having four vertical support legs 12, 14, 16, and 18 and a horizontal hand rest, or cross bar 20 shown connected between the upper legs 12 and 18. Connecting the upper ends of support legs 12 and 14 is an additional hand rest, such as horizontal support member 24. Similarly connecting the upper ends of legs 16 and 18 is a horizontal hand rest, or support member 26, the supports 24 and 26 cooperating with cross bar 20 and legs 12, 14, 16 and 18 to provide a rigid, lightweight support structure, as is well known in the art.

Figure 2:
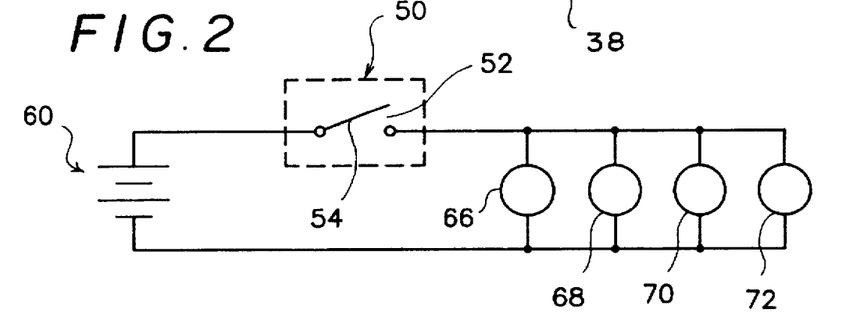
FIG. 2 is a schematic illustration of actuator circuitry for control of the stabilizer mechanism of the walker of FIG. 1.

The walker 10 also includes at the lower ends of vertical support members 12, 14, 16, and 18 respective feet 32, 34, 36, and 38, which may be tips of rubber or some other composition with favorable properties for static friction to hold the walker securely in place to support a user. In accordance with the present invention, these feet are part of a selectable stabilizer mechanism which also includes normally retracted solenoid operated wheel assemblies 42, 44, 46, and 48 affixed to the lower ends of support numbers 12,14,16 and 18, respectively. The wheel assemblies incorporate wheels which are raised and lowered by corresponding solenoids which are activated by, and thus are responsive to, an actuator 50 located on the walker. In the embodiment illustrated in FIG. 1, the actuator is a lever-actuated, normally open electrical switch mounted, for example, on a bottom surface of horizontal support element 20. The actuator 50 is schematically illustrated in FIG. 2 as including a switch 52 which is closable by lever 54. This switch is operable to connect a battery 60 to each of a plurality of solenoids 66, 68, 70, and 72 which are located in the wheel assemblies 42, 44, 46, and 48, respectively. The battery 60 may be a single battery carried on the walker, but preferably represents a small battery located in each of the assemblies 42, 44, 46 and 48. When switch 52 is closed, power is supplied from battery (or batteries) 60 to activation coils of the solenoids 66, 68, 70, and 72 (see FIG. 4) which are wired in parallel to a single battery 60 or in series with corresponding individual batteries. Although four wheel assemblies are illustrated, it will be understood that only one wheel needs to be retractable to provide braking, with the remaining having non-retractable wheels. It is preferred that at least two wheels be retractable as minimum for safety. It will also be understood that although the illustrated walker includes four support legs, a different number may be utilized.

Figure 3:
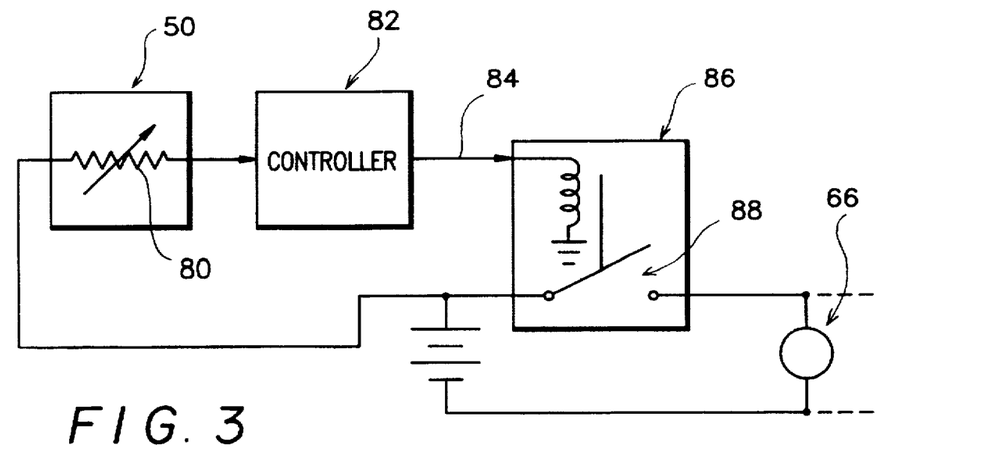
FIG. 3 is a block diagram of control circuitry for a stabilizer mechanism using a pressure sensor as an actuator, in accordance with the present invention.

In FIG. 3 the actuator 50 is illustrated as a pressure sensor 80 which varies in resistance with variations in the force applied by the operator. Changes in the resistance of the sensor are measured by a micro-controller 82 which is programmed to provide an output control signal on line 84 to activate the stabilizer mechanism caused by the walker upon occurrence of a predetermined signal from sensor 80. The output signal may, for example activate a relay 80 to close relay contacts 88 to thereby energize at least one solenoid activation coil 66 of the stabilizer mechanism. Microcontroller 82 may be a small, portable microprocessor-based programmable controller with storage for a control program and having inputs for one or more sensors. The controller 82 preferably operates all of the stabilizer mechanisms carried by the walker, including additional relays, if desired and solenoids 68, 70, and 72, as well as solenoid 66.

Figures 4, 4A, 5, 5A:
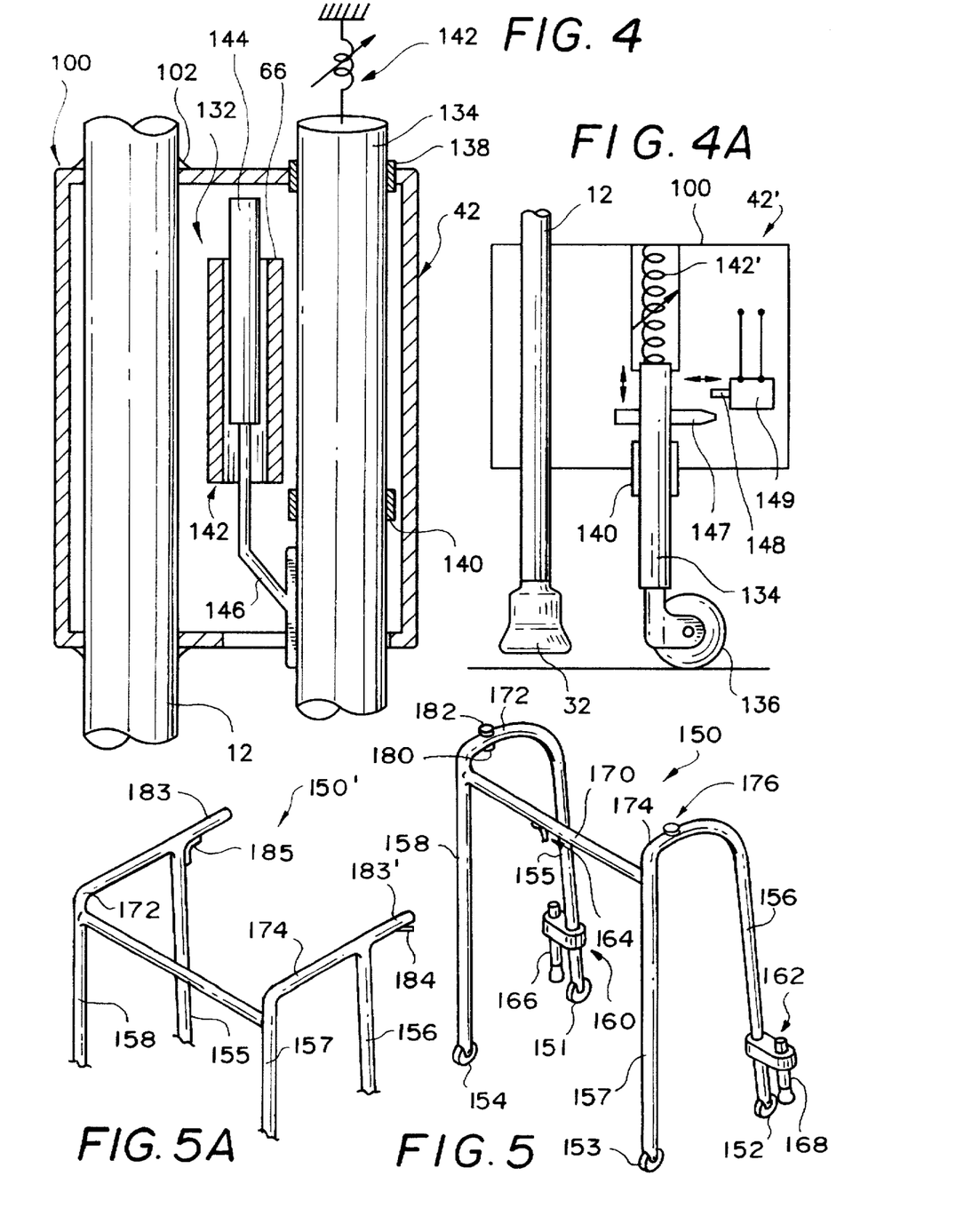
FIG. 4 is a diagrammatic illustration of a solenoid operator for the stabilizer mechanism of the walker of FIG. 1.
FIG. 4A is a diagrammatic illustration of a modified solenoid mechanism for the walker of FIG. 1.
FIG. 5 is a diagrammatic perspective view of an alternate embodiment of the stabilizer mechanism of the present invention incorporating selectively retractable stabilizing feet.
FIG. 5A is a diagrammatic illustration of a modified walker incorporating the actuator of the present invention.

FIG. 4 illustrates, in diagrammatic form, the operative elements of solenoid suitable for lowering the wheels in the wheel assemblies 42, 44, 46, and 48 of the stabilizer mechanism. Each wheel assembly is attached to a corresponding vertical support member, as discussed above, and accordingly the wheel assembly 42 is mounted on leg 12 by way of an assembly housing 100 welded as at 102 or otherwise fastened to the leg. Housing 100 encloses a solenoid mechanism 132 connected to a retractable shaft 134 which supports a corresponding wheel such as swivel wheel 136 (FIG. 1). The retractable shaft is mounted in bushings 138 and 140 secured in the housing to provide vertical motion between an upper retracted position (FIG. 1) in which the wheel does not touch the ground, and a lower extended position (not shown) in which the wheel 136 is in contact with the ground. A bias spring 142, which is shown diagrammatically in FIG. 4, is connected to leg 134 to urge it to the upper normally retracted position. In this retracted position, the tip of walker leg 12 contacts the ground to provide a brake for the walker and to place the stabilizer mechanism in its brake engaged, or stable state.

The solenoid mechanism 132 includes the solenoid activation coil 66 which is cylindrical and surrounds a movable armature 144 which is secured to the retractable shaft 134 by a connecting rod 146. The spring 142 urges armature 144 upwardly through coil 66 when the solenoid is not energized, as illustrated, so that wheel 136 is retracted, but upon energization, the moving armature 144 is forcefully translated axially downwardly through the stationary coil 66, thereby forcing the shaft 134 into its downward position to cause the wheel 136 to lift leg 12 off the ground. This shifts the stabilizer mechanism to its brake-released, or mobile state.

An alternative solenoid brake release assembly 42' is illustrated in diagrammatic form in FIG. 4A, wherein an adjustable bias spring 142' urges the shaft 134 and its wheel 136 downwardly into contact with the ground. The shaft 134 includes a latch 147 which is engagable by a movable armature 148 of a solenoid 149. When the wheel 136 contacts the ground, the walker is in its mobile state. To return it to its stable state, the operator presses downwardly with sufficient pressure to cause shaft 134 to move upwardly against spring 142' and to cause latch 147 to engage armature 148. This places the rubber tip 32 in contact with the ground and thereby engages the brake. To release the brake, the operator merely activates an actuator, as by lifting the walker slightly, to energize the solenoid 149. This retracts armature 148 to enable spring 142' to drive the wheel 136 into contact with the ground. It will be understood that various solenoid-activated latch assemblies may be used.

FIG. 5 illustrates another embodiment of the stabilizer mechanism of the invention wherein retractable stabilizing feet are utilized in place of the retractable wheels of FIG. 1, with the actuator control moving the retractable feet to shift the stabilizer between its brake-engaged (stable) and brake-released (mobile) states. Also illustrated in FIG. 5 is a variation of the invention wherein only two stabilizer assemblies are utilized instead of the four shown in FIG. 1. Thus, a walker 150 includes four wheels 151, 152, 153 and 154 mounted at the lower ends of corresponding vertical legs 155–158, with the stabilizer mechanism including a pair of retractable foot assemblies 160 and 162 mounted on legs 155 and 156, respectively. The assemblies 160, 162 are controlled by an actuator 164, which is illustrated in this case as a lever-operated switch such as the switch 50 described above. The foot assemblies 160 and 162 include retractable stabilizer feet 166 and 168, respectively, which are solenoid-controlled in the manner illustrated with respect to shaft 134 in FIG. 4. In this case, although the direction of motion of the stabilizer mechanism is the reverse of that described with respect to the embodiment of FIG. 4, the result is the same; that is, when the solenoid is not energized, the bias spring urges the stabilizer feet 166 and 168 downwardly into engagement with the ground to prevent rolling motion of the walker 150. Energization of the solenoids in assemblies 160 and 162 by closure of switch 164 retracts the stabilizer feet 166 and 168 to, in effect, release the braking effect of the stabilizer feet and allowing the walker to be moved on its wheels. Release of the switch again deenergizes the solenoid and allows the stabilizer feet 166 and 168 to return to their braking position to prevent the walker from rolling. Accordingly, in both embodiments (FIG. 1 and FIG. 5) deenergization produces a stable state and energization of the stabilizer mechanism produces a mobile state.

The actuator 164 of FIG. 5 is illustrated as being located on the underside of a walker cross member 170 for easy access by a patient whose hands are resting on this bar. However, it will be understood that other actuators or actuator locations may be suitable for operating a stabilizer mechanism of the type illustrated in FIGS. 1 and 4. For example, an alternative location would be on a suitable surface of one of the side bars 172 or 174 which join the top ends of legs 155, 158 and top ends of legs 156, 157, respectively, or may be located on one of the legs if desired. As described above, the actuator 64 may be a lever operated microswitch, a push button switch such as switch 176 mounted on side bar 174, or some other conventional switch operable by a user. If desired, multiple switches may be provided, each at a different location on the walker for convenient access by the user, with such switches being connected in parallel so that any one of them will be operable to activate a stabilizer mechanism such as assemblies 160 and 162.

An alternative, and preferred, form of the actuator is the electrical pressure sensor 80 described with respect to FIG. 3, and which may be positioned at any suitable location on the walker; for example, at 180 on the lower surface of one of the horizontal support members 170, 172 or 174 for detecting an upward, or lifting pressure by a user. If desired, the pressure sensor 80 may be positioned on the upper surface of one of the horizontal support members in a upward facing position, as illustrated at 182, for detecting downward pressure by a user. Such a sensor may be a strain gauge, which may be in the form of a laminated flexible printed circuit securable to a surface by an adhesive tape or the like, so that the position of the strain gauge can be customized to each user's needs. The push-button, lever-operated, pressure sensor, or other actuators may be used in a "mix and match" fashion to meet the desires of a particular user, and can be located anywhere on the walker, for the convenience of the operator.

The force required to cause a microswitch, strain gauge sensor, or actuator to actuate the solenoid-operated elements may be calibrated individually to a selected threshold to meet a particular user's requirements, as by configuring the microcontroller and its attendant control software to provide a calibration mode. Calibration would then be accomplished by intentionally depressing the actuator with a desired amount of force, measuring, as with the microcontroller, that desired force, and storing a value in memory which corresponds to that force. Once this value is stored in the memory of the microcontroller, the value is used as the threshold value for the solenoid assembly actuating force. This can be varied for different users, or for a single user whose needs change.

Although the actuator switches or sensors used in the present invention are illustrated as being mounted on selected surfaces of the structural elements of a walker for direct contact by an operator, in a preferred form of the invention the actuator/sensor is incorporated within the structure of the walker to sense pressure applied to any part of the structure. Thus, a sensor such as a strain gauge may be mounted within support member 170 to detect bending when an operator leans on the walker, or it may be located in one of the legs or in one or more of the wheel assemblies to detect changes in the weight applied to the legs or the wheels when the operator lifts the walker or leans on it, or an actuator such as a microswitch may be located adjacent to a movable component to detect a selected amount of motion. These sensors or actuators can then be calibrated to react to a predetermined weight or to a predetermined lifting effort to activate the stabilizer mechanism.

A variation of the walker 150 is illustrated at 150' in FIG. 5A, wherein a pair of handles 183, 183' extend from the support members 172 and 174 to provide resting and lifting surface for the user. Such a walker may incorporate a lever type actuators such as the actuator 184 shown on handle 183', or may incorporate a strain gauge actuator such as that illustrated at 185 or handle 183. The lever type actuator 184 may be respond to the operator gripping the handle 183', or may respond to a lifting force applied upwardly by the operator. The strain gauge may be located at the joint between the handle 183 and the walker frame to respond to slight bending motions due either to the operator pressing down on, lifting up, or twisting the handle 183.

Figure 6:
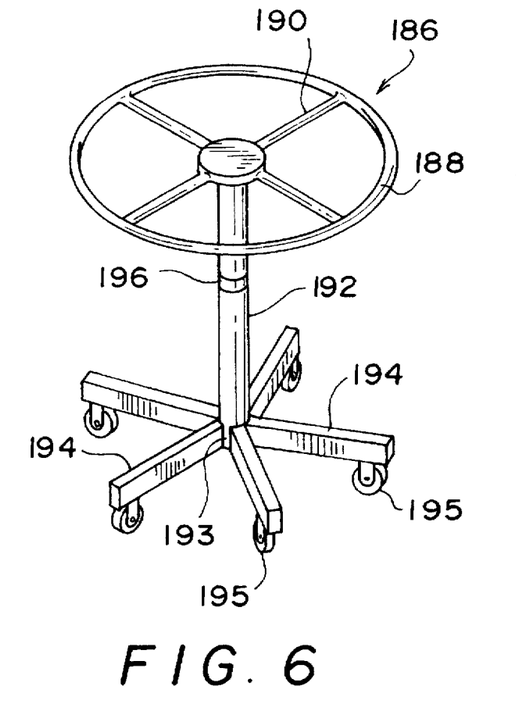
FIG. 6 is a diagrammatic perspective view of another embodiment of a walker illustrative of the invention.

FIG. 6 illustrates another form of walker 186 having, for example, a horizontal, circular or oval hand rest 188 mounted by spokes 190 to a single vertical support post 192. Attached to the bottom of post 192 is a base 193 carrying a plurality of radially extending legs 194 which are supported at their outer ends by corresponding wheels 195. The operator grasps the hand rest 188 for support, and can push the device along for assistance in walking.

Figure 7:
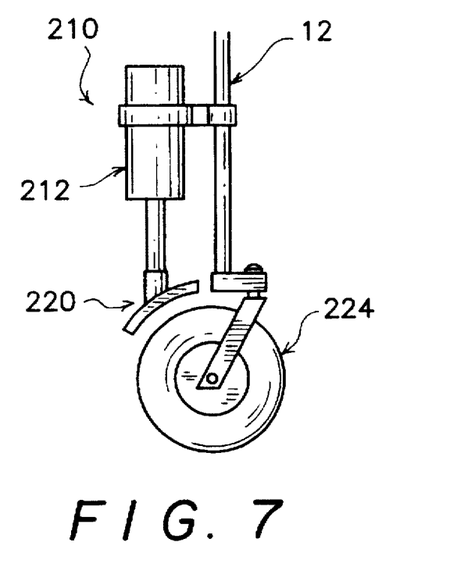
FIG. 7 is a diagrammatic side elevation view of a solenoid-operated brake illustrative another aspect of the present invention.
Figure 8:
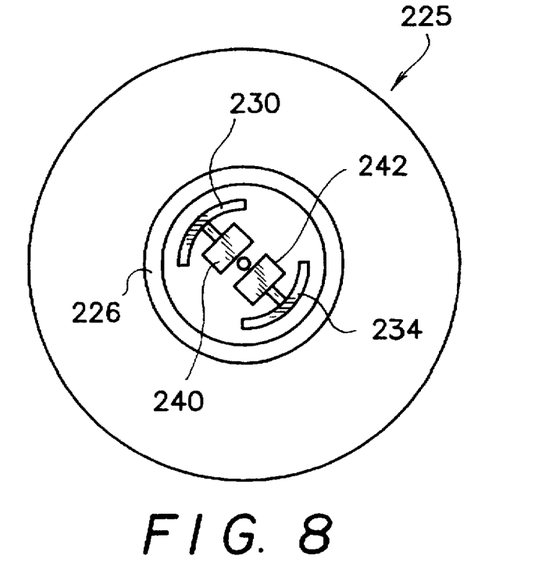
FIG. 8 is a diagrammatic illustration of a drum type brake illustrating still another aspect of the present invention.
Figure 9:
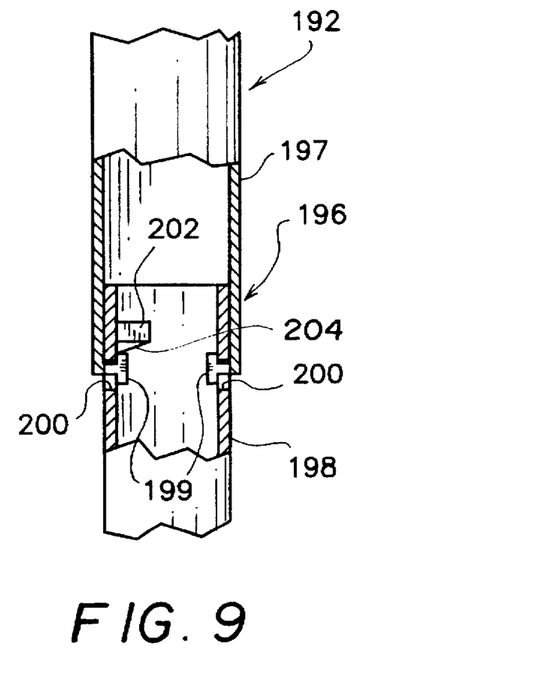
FIG. 9 is an enlarged view of a portion of the walker of FIG. 6.

The motion of the wheels 195 may be controlled for stabilization of the walker 186 by any of the stabilizer mechanisms described above, or the wheels may incorporate suitable electrically-actuated brakes such as the brakes illustrated in FIGS. 7 or 8, to be described. These brakes may be activated by an actuator such as a strain gauge located, for example, in a segment 196 of the post 192. This sensor detects changes in the pressure applied along the post by an operator either lifting or pressing down on hand rest 188. Thus, the sensor is calibrated to detect a lifting pressure to release a stabilizer brake, or to detect a downward pressure to engage a stabilizer brake, as discussed above. The segment 196 of post 192 may in the alternative, incorporate a telescoping section as illustrated in FIG. 9, wherein a top tubular portion 197 telescopes over (or into) a tubular bottom portion 198. A pair of studs 199 extend inwardly from the interior surface of the top portion 197 through corresponding slots 200 in the bottom portion 198 to allow relative telescoping motion between the top and bottom portions. In the preferred form of the invention an actuator such as a microswitch 202 having a switch arm 204 is located on the interior surface of the bottom portion 198. This allows the switch to be activated by upward motion of the top portion 197 with respect to the bottom portion, so that a lifting force on the hand rest 188 activates the switch and the stabilizer mechanism controlled by it. It will be understood that, if desired, the upper telescoping portion 197 can be spring-biased upwardly with respect to the lower portion 198 so that downward pressure on the hand rest moves the upper portion against the spring bias to operate the actuator. Other actuator arrangements responsive to selective motion of the portions 197 and 198 can be provided, if desired.

FIG. 7 illustrates a solenoid-operated brake 210 incorporating a solenoid assembly 212 which applies a downward stroke to a brake shoe 220. Brake shoe 220 is adjacent to, and applies a braking force to, the outer surface of a wheel 224, for example, in response to activation of the sensor at 196. The brake assembly 210 can be mounted on the vertical support leg 12 such as that shown in FIG. 1, on the leg 155 or 156 of FIG. 5, or on one or more of the radial legs 194 in FIG. 6.

Another embodiment for the braking mechanism is illustrated in FIG. 8. As there illustrated, a wheel 225, which may be used on any of the walkers described above, has a hollow hub member 226 and at least one internal drum brake shoe 230 and, preferably, a second opposed brake shoe 234. The brake 230 is actuated by a solenoid assembly 240 and, if a second brake shoe 234 is used, by an additional solenoid assembly 242. The brake may also be configured as a disc brake, if desired. The solenoid-operated brakes shown in FIGS. 7 and 8 preferably include bias springs which normally engage the brakes. The brakes then are selectively disengageable by operation of any of the actuators or sensors discussed above; however, in the alternative, the brakes can be biased to a released position, and engaged by operation of the solenoids, if desired.

If desired, the bias springs of the brakes of FIGS. 7 and 8 may be adjusted to maintain a selectable amount of contact with the wheels even when released to control the free motion of the walker. The amount of drag is selected to meet the requirements of the operator, as discussed above. As an alternative to an adjustable bias spring, the microcontroller can be programmed to direct a selected activating current to the solenoid even when the brakes are released to leave the brake partially engaged.

Figure 10:
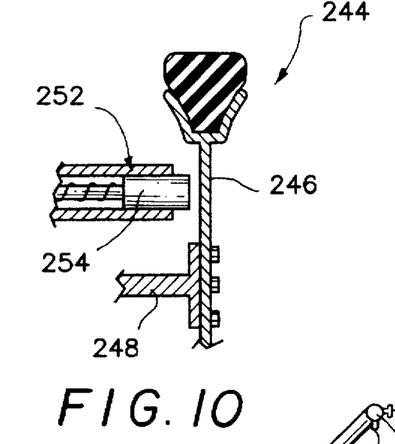
FIG. 10 is a diagrammatic illustration, in partial section, of a magnetic stabilizer mechanism in accordance with the invention.

Another braking mechanism is illustrated diagrammatically in FIG. 10 wherein a wheel 244 includes a central disc-shaped hub area 246 of magnetic material, such as steel. The wheel is mounted to an axle 248, in a conventional manner, as by bolts 250, for rotation, with the axle being mounted on the walker. Mounted adjacent the disc-shaped hub 246 is a stationary magnetic brake 252 having a movable armature 254. The brake is electrically activated upon operation of an actuator to magnetize the armature 252 and to cause the armature to be attracted to the hub to clamp the hub and to produce a magnetic braking action. Other magnetic brakes may also be used.

Figure 11:
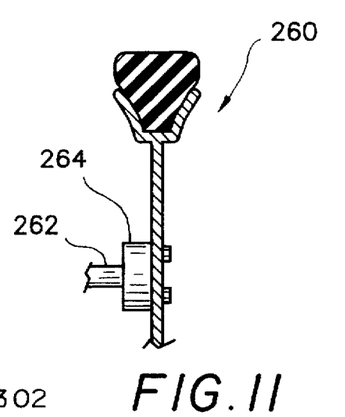
FIG. 11 is a diagrammatic illustration, in partial section, of an electrical stabilizer mechanism in accordance with the invention.

In still another embodiment of the invention, illustrated diagrammatically in FIG. 11, a wheel 260 mounted on an axle 262 is rotated by a small direct current electric motor 264 connected to a suitable battery by a suitable actuator, as described above for the solenoids. The power to the motor is controlled by the microcontroller 82 to switch it on and off, to regulate the direction of operation of the motor, and to control its speed in response to the actuator 50 in its various forms, as described.

In use, the walker of the present invention is normally in a stable state, meaning that the brakes of FIGS. 7 or 8 are spring-biased to be normally engaged, that the wheels in the embodiment of FIG. 1 are normally up, that the rubber coated stabilizer feet of FIG. 5 are spring biased to be normally down, that the magnetic brake of FIG. 10 is engaged, or that the electric motor of FIG. 11 is deenergized. The sensitivity of the actuators or sensors provided on the walker is adjusted in accordance with the weight, strength, or other characteristic of the operator, and the operator may then render the walker of any of these embodiments mobile by applying pressure to the actuator. As noted above, the actuator may be a lever, button, pressure sensor, motion sensor or a combination of these. If a pressure sensor is used, it may be positioned to respond to downward or upward pressure on the walker, or may be hand or finger-controlled. If a lever or button is used, the operator simply grasps the walker and operates the actuator, for example by lifting the walker slightly or by moving a lever or button, thereby placing the walker in a mobile state. The operator moves the walker a chosen distance, e.g., the length of the operator's reach, and releases the actuator, thereby returning the walker to the stable state, and either concurrently or thereafter walks to a position closer to the walker.

As noted above, the operation of the walker may be customized by selecting the threshold value for the force required on the actuator to operate the solenoid and to change from a stable state to a mobile state. For an arthritic patient, a plurality of pressure sensors, positioned on both upper and lower horizontal surfaces, allow easy access to an actuator. An actuator may also be placed within a receiving pouch, pocket or glove which is mounted on the walker, thereby eliminating the need to grasp the walker, and facilitating use by an arthritic patient, who needs only to place his or her hand within the pouch to render the walker mobile.

Figures 12, 13:
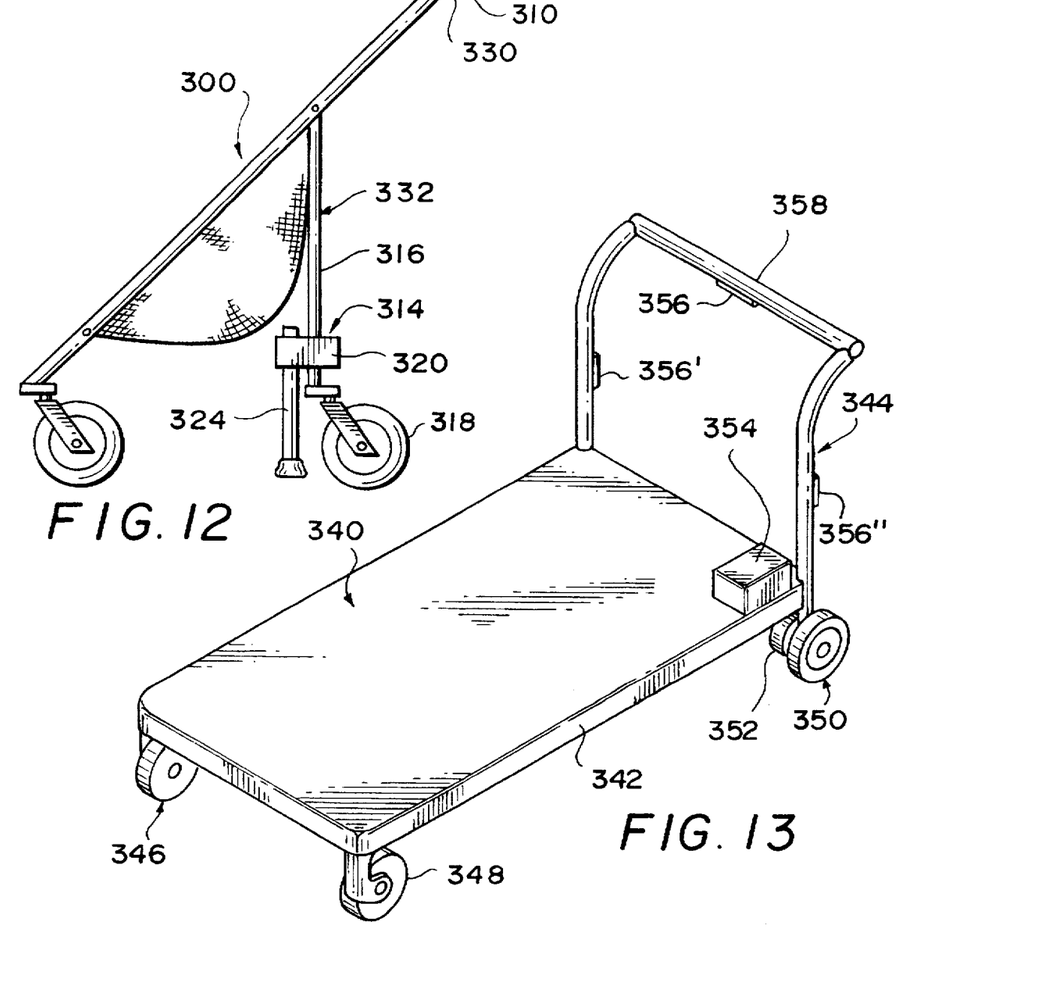
FIG. 12 is a side elevation of an alternative wheeled vehicle using the control mechanism of the present invention.
FIG. 13 is a diagrammatic perspective view of another wheeled vehicle using the control mechanism of the present invention.

FIG. 12 illustrates the application of the control system of the present invention to other wheeled vehicles such as a baby carriage or stroller 300, wherein an actuator 302 such as the button, lever or pressure sensor discussed above, is affixed to a convenient support surface such as a horizontal handle 310. In this embodiment, the carriage includes a normally retracted solenoid-operated stabilizer foot assembly 314 which is mounted on a vertical support 316, which also supports a stroller wheel 318. A solenoid armature such as that illustrated at 144 in FIG. 4, is located within a housing 320 and is normally biased downwardly to drive a stabilizer foot 324 into a downward position, thereby providing a passive brake for the carriage. The stabilizer foot 324 may slightly lift at least one wheel 318, and it will be understood that any wheel can incorporate this assembly to effectively lock the carriage. Activation of switch 302 energizes the solenoid assembly to lift the foot 324 and to release the brake. The baby carriage can alternatively have a pressure sensor such as a strain gauge actuator mounted on the underside of the handle 310 in a downwardly facing position, such as at 330. With this sensor orientation, an upward, or lifting, pressure on the bar 310 will render the carriage mobile by releasing the stabilizer foot brake. The carriage may alternatively use the selectively actuable brakes of FIGS. 7,8,10 or 11. The wheels of the baby carriage may also include the built-in rolling resistance described above. It should be noted that wheeled vehicles such as this usually have two rear vertical support elements 316, either or both of which are suitable for the assembly 314.

In summary, then, the walker of the present invention may incorporate a safety brake mechanism which completely stops, or stabilizes a walker in its normal condition. The brake may be released in response to the operation of an actuator switch which may be in the form of an electric button, lever, sensor, or the like operating to activate or deactivate the brake mechanism. The actuator switch may be calibrated to require a selected actuation force, or threshold, so that the force required to operate it can be adjusted to the changing needs of the operator. The switch preferably provides a passive brake, where the brake mechanism becomes engaged whenever the actuator is released, thus requiring a positive action by the operator to enable the walker to be easily moved. The brake may be spring biased toward engagement, and released by the solenoid, or may be spring-biased toward release and engaged by the solenoid. The walker may include at least one wheel and an associated brake where braking is responsive to a selected pressure applied to the walker by the operator. The spring force may be preselected in accordance with the weight of the user, for example, or can be alterable after it is installed in the brake mechanism. The brake actuator mechanism may respond to downward pressure, as by providing pressure sensors in one or more legs of the walker or on selected surfaces of walker handholds, or can be responsive to lifting forces. Thus, for example, an actuator responsive to lift may produce an output to activate a solenoid which will release a lever, disengage a brake, or engage a wheel with the ground.

Additionally, the brake mechanism may be adjusted to shift between a fully engaged locked, or stable, position and a fully released, free or mobile position. Alternatively, the brake may be adjusted to remain partially engaged in the mobile position to provide a continuous, preselected or selectable resistance to rolling.

A simplified version of the lift actuator of the present invention is illustrated in FIG. 13, wherein a wheeled vehicle such as a baggage cart 340 includes a horizontal platform 342, a handle generally indicated at 344 at one end of the platform, and suitable wheels at the four corners of the platform. Thus, for example, the forward end of the cart 340 may incorporate swivel wheels 346 and 348 for steering the device and include rear wheels, one of which is illustrated at 350. In the illustrated embodiment, the wheel 350 may incorporate an electric drive motor 352 connected directly to the wheel or connected through suitable gearing, in known manner, the motor may be driven, for example, by a battery 354 carried on the cart 340, with power to the motor being controlled by an actuator 356 on handle 344. The actuator 356 may be any of the actuators described hereinabove, but preferably is a pressure sensor located on the under surface of a horizontal bar 358 forming a part of the handle assembly 344. The pressure sensor 356 responds to a lifting force applied to the under surface of bar 358, in the manner described above, to actuate drive motor 352 and convert the cart to its mobile state. Release of the actuator 356 removes power from the motor 352 so that the motor assembly provides resistance to rolling motion of wheel 350 and brings the cart 340 to a stop. If desired, additional passive braking may be provided, as described above, but in its simplest version, a simple lifting force applied to the handle controls the motion of the cart. As described above, the actuator 356 may be adjustable to respond to a selected degree of lifting force. Although actuator 356 is illustrated on crossbar 358, it will be understood that it can alternatively be placed in one of the vertical handles which support bar 358, as illustrated at 356' or 356", or can be in any or all of these locations.

Figures 14A, 14B, 15, 16, 17, 18:
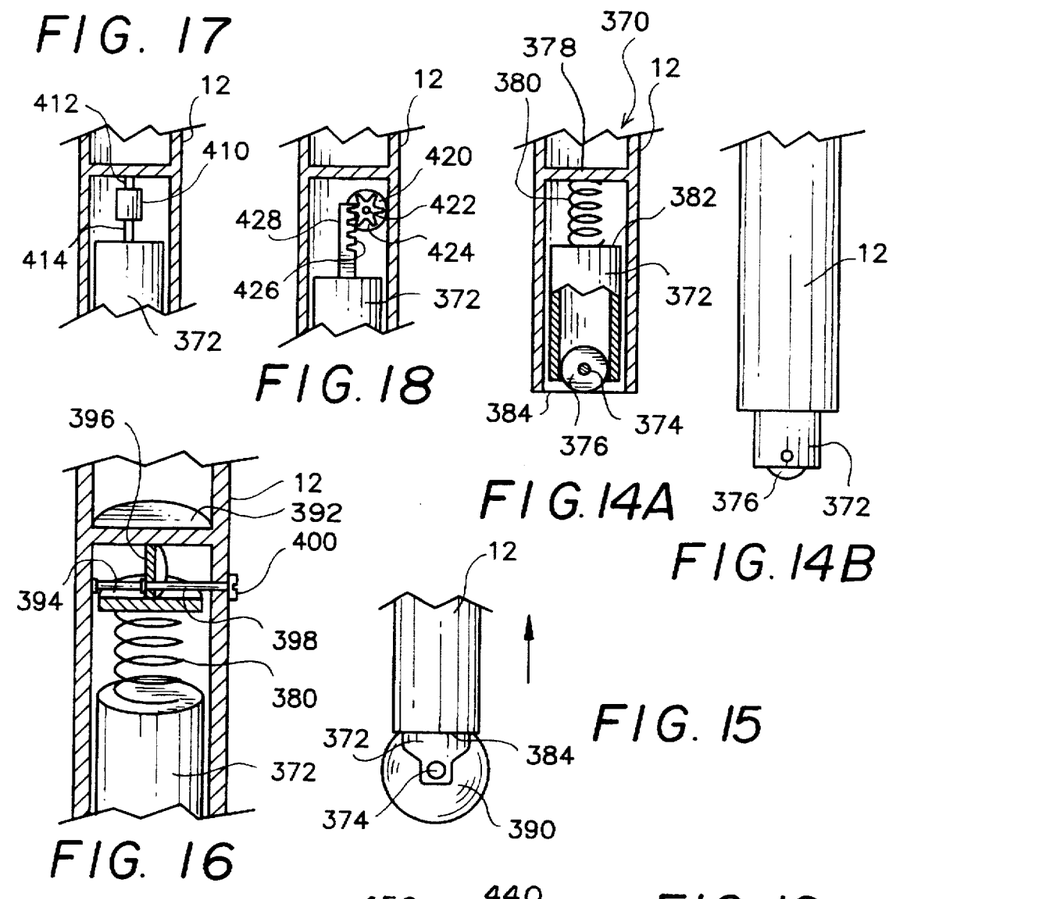
FIG. 14A illustrates a cross-sectional view of a mechanically-actuated stabilizer mechanism with the brake engaged.
FIG. 14B illustrates the mechanism of FIG. 14A with the brake released.
FIG. 15 illustrates a modification of the embodiment of FIGS. 14A and 14B wherein the brake engages a wheel instead of the ground.
FIG. 16 is a diagrammatic cross sectional view of an adjuster for the stabilizer mechanism of FIGS. 14A and 14B.
FIG. 17 illustrates in a partial diagrammatic cross-section an alternative lift assembly in place of the spring of FIG. 14A.
FIG. 18 illustrates in a partial diagrammatic cross-section, still another alternative lift assembly.

In still another embodiment of the invention, as illustrated in FIGS. 14A and 14B, a walker such as that illustrated in FIG. 1 incorporate in one of its legs an alternative stabilizer assembly generally indicated at 370. This assembly may be located within one or more of the vertical legs; for example, within leg 12, instead of the wheel assemblies shown in FIG. 1. The assembly 370 includes, for example, a wheel mount 372 which carries at its lower end an axle 374 on which is mounted for rotation a wheel 376. The axle 374 extends diametrically through mount 372, which may be tubular and capable of vertical telescoping motion within the tubular leg 12. It will be understood that the tubular leg 12 and the tubular wheel mount 372 may be circular in cross section, may be rectangular, or may have some other suitable cross sectional shape.

In the described embodiment, the tubular leg 12 includes a spring mount 378 which extends diametrically across the interior of leg 12 to support the upper end of a spring 380. The lower end of the spring is supported on the upper surface 382 of wheel mount 372, with the spring being sized to urge the wheel mount and wheel 376 out of the lower end 384 of leg 12. The spring is selected so that the weight of the walker will be sufficient to cause the wheel assembly 370 to telescope upwardly into the bottom of leg 12, compressing the spring 380 but allowing the leg to contact the ground and to serve as a brake. Thus, in the passive, or rest condition, the leg 12 is engaged with the ground and the wheel is retracted into the lower part of the leg, thereby providing a passive brake for the walker.

If the operator lifts the walker, the spring 380 will urge the wheel assembly out of the bottom of leg 12, as illustrated in FIG. 14B keeping the wheel in contact with the ground, but lifting the leg 12 so as to release the brake. It will be understood that the compression strength of spring 380 will be selected to balance the weight of the walker so that only a predetermined amount of lift on the walker itself will be required to release the brake and allow the walker to be moved on its wheels. Again, it will be understood that preferably only one or two of the legs on the walker will incorporate the wheel assembly 370; for example, the two rearward legs nearest the operator, with the two forward legs, furtherest away from the operator including wheels which are mounted on the legs so as to always be in contact with the ground. Accordingly, a predetermined lifting force on the walker will release the passive brake and allow the walker to be rolled forward by the user.

As illustrated in FIG. 15, it is not necessary to have the wheels retract completely into the bottom of leg 12. Instead, an enlarged wheel 390 may be mounted on axle 374 at the bottom of wheel mount 372 so that the lower edge 384 of the leg 12 engages and acts as a brake on the outer surface of wheel 390. The wheel assembly is otherwise the same as that illustrated in FIG. 14A and operates in the same way.

If desired, an adjustable feature may be provided for spring 380 to permit variation in the amount of lift required to release the brake provided by assembly 370. In this case, the support bracket 378 may be in the form of a plate 392 within the hollow, tubular leg 12. An additional floating adjustment plate 394 is mounted to the upper end of spring 380, with plate 394 being generally parallel to plate 392 but spaced away from it. A cam 396 is mounted between plates 392 and 394 and is supported by and rotatable with a cam shaft 398. Shaft 398 may extend, for example, diametrically across tube 12, and may extend through the wall of leg 12 for connection to an adjustment knob 400 on the exterior of the leg. Rotation of knob 400 rotates shaft 398 and, in turn, rotates cam 396 to vary the distance between plates 392 and 394. This, in turn, changes the compression of spring 380 when the device is in the brake-engaged position illustrated in FIG. 14A and thus allows adjustment of the lifting force required to release the brake.

Although the embodiments of FIGS. 14A–16 illustrate a coil spring 380 as a suitable lift element for urging the frame leg 12 upwardly with respect to the ground-engaging wheel 390, it will be understood that other elements with a similar lifting function can be used. For example, as illustrated in FIG. 17, the lift element may be a pneumatic cylinder 410 connected through rods 412 and 414 to the frame 12 and to the wheel support 372, respectively. A selected air pressure within cylinder 410 provides the degree of lift required to substantially balance the weight of the walker frame so that only a small amount of operator-provided lifting force is required to release the brake mechanism and shift the walker to its mobile state by lifting frame leg 12 off the ground or out of contact with wheel 390.

FIG. 18 illustrates still another embodiment wherein lifting force is provided by an electric drive motor 420 mounted on either the frame 12 or the wheel support 372. The motor is illustrated as being mounted on the frame 12, with the motor shaft 422 carrying a toothed pinion gear 424. The gear teeth engage corresponding teeth 426 on a rack 428 connected to wheel support 372. Activation of the motor 420, as by means of an actuator 356 or the like, causes pinion gear 424 to drive rack 428, and this wheel support 372 downwardly with respect to frame 12 to release the brake. Release of the actuator switches the motor off, to allow the weight of the frame to drive the motor in reverse until the frame engages the brake.

Figure 19:
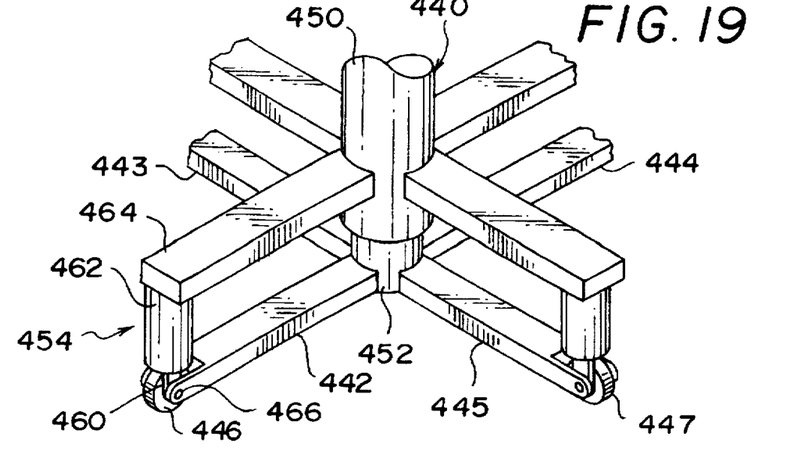
FIG. 19 illustrates in partial perspective view another alternative brake release assembly.

Another embodiment of the present invention is illustrated in diagrammatic form in FIG. 19. This embodiment of the walker is similar to that of the walker illustrated in FIG. 6 and incorporates a central support post 440 connected at its upper end (not shown) to a hand rest such as that shown at 88 in FIG. 6. The post 440 is connected at its lower end to the inner ends of a plurality of radially extending legs 442 through 445. The outer ends of the legs are bifurcated and carry ground-engaging wheels such as those illustrated at 446 and 447. The central support post 440 includes, in this embodiment, an outer tubular portion 450 and an inner tubular portion 452 telescoped within the outer portion for relative motion along the axis of the support post. The outer portion of the support post carries a stabilizer assembly generally indicated at 454 which operates in response to vertical motion of the outer portion 450 with respect to inner portion 452 to engage or release suitable brakes for the wheels carried at the ends of support legs 442 through 445. In one form of the invention, the telescoping post may incorporate a lift mechanism such as those illustrated in FIGS. 16, 17, or 18 to release the stabilizer mechanism brakes in response to a lifting force applied to the upper portion of support post 440 by an operator.

An example of a brake arrangement for stabilizer assembly 454 incorporates the brake illustrated in FIG. 15. In this arrangment, the wheel 446, for example, is secured to a wheel mount 460 which extends upwardly into a tubular guide 462 secured to the outer end of a radial arm 464 which is above, and parallel to, support leg 442. The arm 464 is secured at its inner end to telescoping portion 450 for vertical motion with portion 450. The lower edge of guide 462 rests on wheel 446 and acts as a brake. Upward motion of section 450 with respect to section 452 of the support post will raise the guide 462 away from wheel 446, in the manner described with respect to leg 12 in FIG. 15, to release the brake. It is noted that the wheel 446 is mounted on an axle 466 which extends through the outer end of leg 442, as described above, while the wheel mount 460 which is carried on axle 466, extends upwardly into tubular guide 462. In this way, the wheel mount 460 provides a vertical track for motion of the guide tube 462, allowing the motion of telescoping portion 450 to move the stabilizer assembly 454 downwardly to engage the brake against the outer surface of wheel 446, with upward motion of portion 450 releasing the brake.

If desired, balancing springs such as those illustrated in FIG. 14A may be provided within the tubular guide 462 to compensate for the weight of the stabilizer assembly 454, the telescoping post portion 450, and the hand rest (not shown), so that only a small lifting force is required to release the brake. This spring force can be adjustable in the manner illustrated with respect to FIG. 16, may incorporate a pressure cylinder such as that illustrated in FIG. 17 or may incorporate a drive motor such as that illustrated in FIG. 18. Thus, the brake assembly may be mechanically operated or electrically operated, as desired. It will be understood that a brake such as that illustrated at 462 preferably will be provided for each of the wheels on the walker.

As illustrated in FIG. 9 for the telescoping support leg 192, any relatively-movable elements of the walker can be employed to operate a mechanical, electrical, or electromechanical switch to activate or to release a brake. Motion of one element with respect to another can serve to latch or to release a mechanical latch structure, such as that illustrated in FIG. 4A, or can activate an electromechanical actuator such as the microswitch of FIG. 9. Another alternative is the electrical actuator 470 illustrated in FIG. 20. This actuator may be in the telescoping leg 192 of a walker, for example, and incorporates a pair of electrical contacts 472 and 474 connected in circuit through wires 476 and 478 and battery 480 to operate, for example, a solenoid-driven brake such as that illustrated in FIG. 8. The contact 472 may be a part of a stud such as one of the studs 199 of FIG. 9, with the stud being mounted on leg portion 197 and electrically insulated from both telescope leg portions 197 and 198. The contact 474 is mounted on, and electrically insulated from, the leg portion 198. The contact 474 is mounted on, and electrically insulated from, the leg portion 198, and is engaged by contact 472 when the leg portion 197 is lifted by the operator of the walker. The lifting of the walker closes the contacts 472 and 474 to energize a solenoid to thereby release a brake and permit the walker to be easily moved. When the operator releases the walker, the contacts 472 and 474 open to deactivate the solenoid and to cause the brake to reengage.

Figures 20, 21, 22, 23, 24:
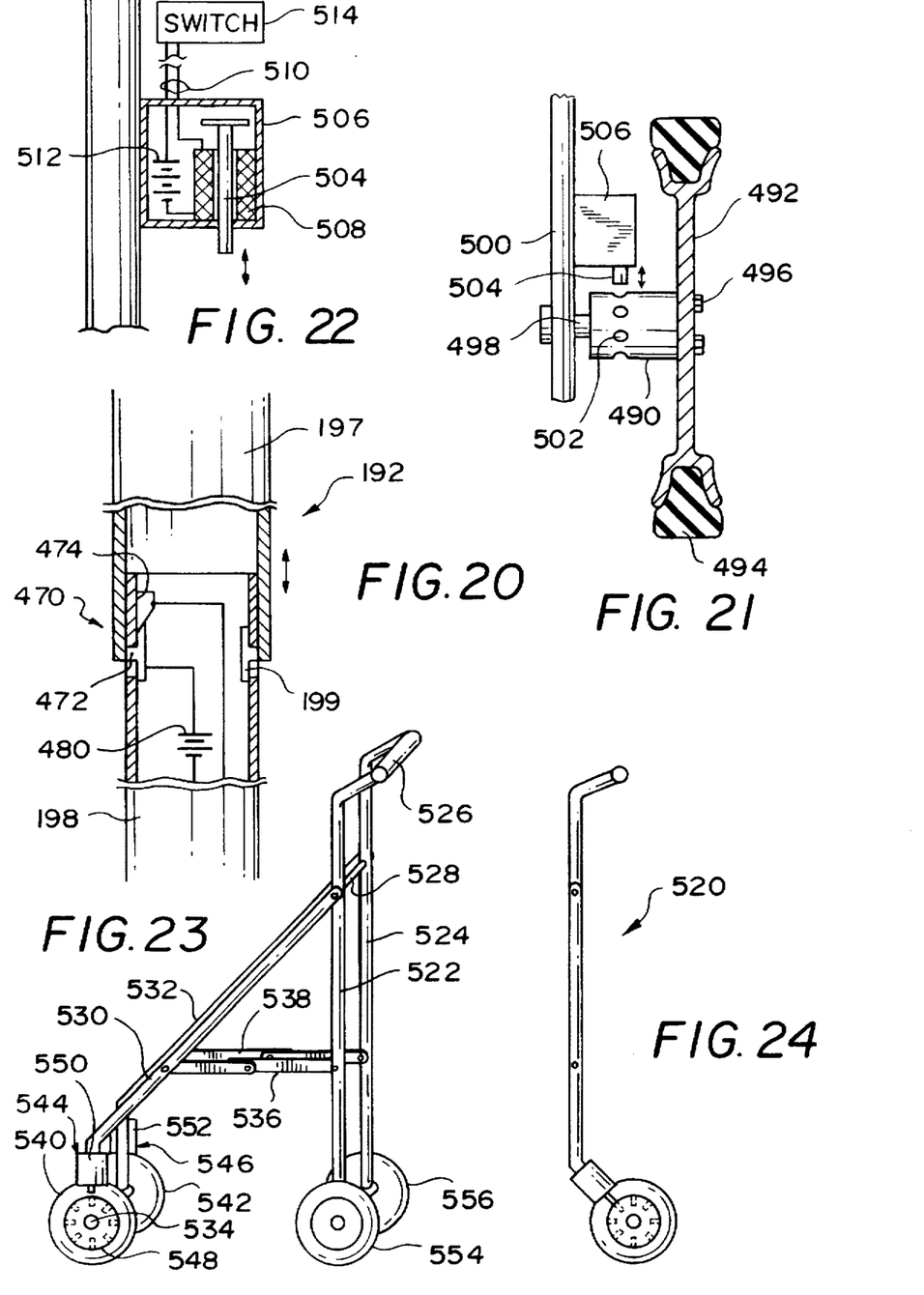
FIG. 20 illustrates in partial cross-section a telescoping leg portion incorporating actuator switch contacts.
FIG. 21 is a partial cross-section of a solenoid-operated pin-type brake.
FIG. 22 is an enlarged partial view of the device of FIG. 21
FIG. 23 is a perspective view of a collapsible walker.
FIG. 24 is a side elevation of the walker of FIG. 23 in its collapsed state.

Another brake structure suitable for use in a walker is illustrated in FIGS. 21 and 22. This brake, which is referred to herein as a pin-type brake, includes a hub 490 which supports wheel 492 for a walker. The wheel may include a rubber tire 494, and is secured to the hub by bolts 496, for example. The hub is mounted on an axle 498 carried by the walker, and may be supported in a walker leg 500, for example. The hub carries a multiplicity of radial bores 502 around it circumference, the bores being sized and positioned to receive a movable brake pin 504 carried in a housing 506.

The hub pin 504 extends through a solenoid coil 508 (FIG. 22) which is connected by way of wires 510 and battery 512 to a suitable control switch 514 located on the walker. Closure of switch 514 connects battery 512 to the solenoid to pull pin 504 upwardly (as viewed in the figures) away from hub 490, while opening the switch denergizes the solenoid coil and releases the pin. The pin then falls down toward the hub and into any one of the radial bores 502 which is aligned with the pin by rotation of wheel 492. The pin then locks the hub against further rotation. When the brake is to be released, the switch is actuated to energize coil 508 and to pull pin upwardly away from the hub.

It will be apparent that switch 514 can be any of the switches described above such as switch 470 illustrated in FIG. 20, so that a lifting motion or pressure on the walker will activate the switch and this will activate the brake. In addition, it will be understood that the radial bores may be provided in the axle itself, rather than on the hub, if desired.

The walkers illustrated in the foregoing figures may be made foldable, if desired, in order to reduce the space required by the device in locations such as elevators, or when it is desired to store the device. The walker of FIG. 1, for example, can be made foldable by providing lockable swivel joints at the tops of legs 12 and 18. Such joints, when released, would allow legs 14 and 16 to be folded inwardly against the cross bar 20. By activating the brakes on each of the legs when the device is folded the walker is made sufficiently stable to allow it to be used.

Another foldable walker structure is illustrated at 520 in FIGS. 23 and 24. This walker is similar to the stroller of FIG. 12, although other configurations may be used. As illustrated, the walker 520 includes a pair of spaced rear legs 522 and 524 joined at their top ends by a handle 526 and secured at a mid location by a cross bar 528. Pivotally attached to legs 522 and 524 are a pair of forward legs 530 and 532, respectively, which may be joined at their lower ends by an axle 534. The read and front legs 522 and 530 are joined at their approximate midpoints by a foldable brace 536, and legs 524 and 532 are similarly joined by foldable brace 538. The braces are pivotally mounted to their respective legs to permit the walker to be folded flat, as illustrated in FIG. 24.

Wheels 540 and 542 are mounted on axle 534 at the bottoms of the front legs 530 and 532, and suitable brakes are provided for at least one, and preferably both, of these wheels. As illustrated, pin-type brakes 544 and 546 are provided, although in this embodiment the brake hubs, such as hub 548 on wheel 544, are located outside the wheels, and the locking pin mechanisms 550 and 552 are mounted on a bracket to extend over the wheels, to provide space between the front legs to receive the rear legs when the walker is folded. If desired, the rear legs may carry corresponding wheels 554 and 556 which may also incorporate brakes, if desired. The front wheels will normally be locked prior to folding the walker into the configuration illustrated in FIG. 24, so that the walker will be stable, and can, in effect, be used as a cane.

It will be understood by those with skill in the art that when a brake is provided for each of a multiplicity of wheels on a walker, preferably all of them will be actuated simultaneously either electrically or mechanically. Thus, for example, in the walkers illustrated in FIGS. 1 or 6, where four electrical brake assemblies are provided, all of these assemblies are connected to a single controller such as that illustrated in FIG. 2 to operate all of them simultaneously in response to a single actuator switch or to a lifting force applied to the walker itself. Where the stabilizer mechanism is mechanically operated, such as by the arrangements illustrated in FIGS. 14A, 14B, 15 and 16, bias springs may be provided to permit selection or adjustment of the lifting force required to operate all of the brakes at essentially the same time, or alternatively, a single mechanical brake structure that engages a plurality of wheels, such as that illustrated in FIG. 19, can be used. Finally, it will be understood that the brake assemblies preferably operate with a "snap action" between their engaged and released positions so that when the brake is operated, it will fully engage or will fully release. An exception to this may occur when it is desired to maintain a drag on one or more wheels to prevent the walker from becoming free wheeling. Such a snap action may be controlled by suitable latch mechanisms, such as that illustrated in FIG. 4A, which may be electrically operated, as shown, or may be mechanically activated by an actuator through a suitable release cable.

Although the preferred embodiments of the present invention are directed to stabilizers for walkers, a number of alternatives are also described to illustrate the application of the present invention to other types of wheeled vehicles. It will be apparent to those of skill in the art, however, that the invention can be further extended to vehicles such as wheelchairs, wherein actuators may be positioned on the arm rests or on the hand grips at the rear of the chair. The invention is also applicable to carts which are to be lifted or pushed, to children's toys such as scooters which can use a passive stabilization system as part of a safety braking scheme, or the like. Accordingly, those of ordinary skill in the art will recognize that numerous modifications of the described embodiments may be made without departing from the true spirit and scope of the invention. Therefore, the invention is not restricted to the embodiments disclosed herein, but is defined in the following claims.

I claim:

1. A controller for a wheeled vehicle to be pushed or pulled by a user, comprising:
   a frame including relatively movable elements and carrying a wheel and a wheel support member;
   an actuator having a first state and a second state, said actuator being affixed to said frame and responsive to relative motion of said frame elements produced by lifting and releasing said frame to shift between said first and said second states;
   a stabilizer brake mechanism affixed to said support member and having an engaged position for placing the vehicle in a stable state and a released position for placing the vehicle in a mobile state and being normally in one of said positions, said stabilizer being movable between said engaged and released positions, respectively, when said actuator is shifted between said first state and said second state; and
   means for adjusting said actuator to calibrate the response of said stabilizer to said actuator.

2. The controller of claim 1, wherein said stabilizer brake mechanism includes means engagable with said wheel to secure said vehicle in said stable position.

3. The controller of claim 1, wherein said wheel support member includes a wheel support carrying said wheel and mounted for motion with respect to said frame and wherein said stabilizer brake mechanism includes a lift element between said wheel support and said frame.

4. The controller of claim 3, wherein said stabilizer brake mechanism lift element urges said wheel support downwardly with respect to said frame, and wherein said frame is sufficiently heavy to normally overcome said lift element to place said stabilizer in said engaged position, whereby a lifting force applied to said actuator releases said stabilizer lift element to allow the stabilizer to shift from said engaged position to said released position.

5. The controller of claim 4, wherein said lift element is an air cylinder.

6. The controller of claim 3, wherein said lift element is an air cylinder.

7. The controller of claim 1, wherein said wheeled vehicle is a walker.

8. A walker, comprising:
   a support member incorporating a relatively movable support element;
   an actuator located on said support member and being shiftable between first and second positions in response to relative motion of said support element with respect to said support member;
   a stabilizer mechanism including at least one rotatable wheel mounted on said support member and a pin brake assembly responsive to said actuator for controlling the rotation of the wheel, said pin brake assembly engaging said wheel to place the walker in a stable state when said actuator is in said first position and releasing said wheel to place the walker in a mobile state when said actuator is in a second position.

9. The walker of claim 8, wherein said support member and said support element comprise telescoping upper and lower support posts, respectively, said actuator being mounted to switch between said first and second positions in response to relative motion between said upper and lower support posts.

10. The walker of claim 8, wherein said actuator is a switch which is normally in said first position to cause said pin brake assembly to engage said wheel.

11. The walker of claim 10, wherein said switch is shifted to said second position in response to lifting of said walker support member to cause said pin brake assembly to release said wheel.

12. The walker of claim 11 wherein said pin brake assembly includes at least one bore rotatable with said wheel and a pin mounted on said support member and movable in response to said switch to engage or disengage said bore.

13. The walker of claim 11, wherein said pin brake assembly includes a solenoid-operated pin, said solenoid being deenergized by said switch in said first position and being energized by said switch in said second position.

14. The walker of claim 12, further including a hub mounted on said wheel and incorporating said bore.

15. The walker of claim 14, further including a multiplicity of radially-extending bores located in said hub to receive said pin.

16. The walker of claim 15, wherein said switch in said first position causes said pin to engage one of said bores to place the walker in a stable state.

17. The walker of claim 16, wherein said switch, when in said second state, disengages said pin from said one of said bores to place the walker in a mobile state.

18. A walker for use by a person as an aid to walking, comprising:
    a support frame for supporting a person using the walker;
    means for mounting at least one rotatable ground-engaging wheel on said support frame for moving said walker;
    brake assembly for controlling the rotation of said wheel, said brake assembly having a first position engaging said wheel to prevent rotation thereof and having a second position releasing said wheel to allow rotation thereof;
    a brake actuator on said support frame for shifting said brake assembly between said first position and said second position, said brake actuator normally shifting said brake assembly to said first position when said walker is stationary and being responsive to lifting of said support frame by a person using the walker to shift said brake to said second position to release said wheel and to permit rotation thereof to allow said walker of claim 18, wherein said brake assembly is a pin brake including a hub mounted on said wheel and carrying at least one radial bore, and a movable pin which engages a radial bore in said hub when said brake assembly is in said first position, and which is removed from said bore when said brake assembly is in said second position.

19. The walker of claim 18, wherein said actuator is a switch responsive to lifting of said support frames.

20. The walker of claim 19, frame includes first and second relatively movable support elements, and wherein said switch is responsive to relative motion between said first and second support elements resulting from lifting of said support frame by a person using the walker.

21. The walker of claim 18, wherein said brake actuator is a spring.

22. The walker of claim 21, wherein said spring is connected between said support frame and said means for mounting said wheel, said spring releasing said brake upon lifting of said support frame by a person using the walker.

23. The walker of claim 18, further including means for calibrating said actuator.

* * * * *

UNITED STATES PATENT AND TRADEMARK OFFICE
CERTIFICATE OF CORRECTION

PATENT NO. : 5,794,639
DATED : August 18, 1998
INVENTOR(S) : Eli Einbinder

It is certified that error appears in the above-identified patent and that said Letters Patent is hereby corrected as shown below:

In The Claims

Claim 18, line 19, cancel "to allow said walker of" and substitute a period (--.--);

Lines 20-26, cancel the lines.

Add the following new claim:

-- 24 - The walker of claim 18, wherein said brake assembly is a pin brake including a hub mounted on said wheel and carrying at least one radial bore, and a moveable pin which engages a radial bore in said hub when said brake assembly is in said first position, and which is removed from said bore when said brake assembly is in said second position. --

Signed and Sealed this

Twenty-sixth Day of October, 1999

Attest:

Q. TODD DICKINSON

*Attesting Officer*  *Acting Commissioner of Patents and Trademarks*